(12) United States Patent
Bray et al.

(10) Patent No.: US 11,015,255 B2
(45) Date of Patent: May 25, 2021

(54) SELECTIVE PLATING OF THREE DIMENSIONAL SURFACES TO PRODUCE DECORATIVE AND FUNCTIONAL EFFECTS

(71) Applicant: MacDermid Enthone Inc., Waterbury, CT (US)

(72) Inventors: Paul Andrew Bray, South Staffordshire (GB); Martin Vaughan Herbert, Wiltshire (GB); Keith Paul Parsons, Wiltshire (GB); Peter Alan Warwick, Oxfordshire (GB)

(73) Assignee: MacDermid Enthone Inc., Waterbury, CT (US)

( * ) Notice: Subject to any disclaimer, the term of this patent is extended or adjusted under 35 U.S.C. 154(b) by 211 days.

(21) Appl. No.: 16/201,092

(22) Filed: Nov. 27, 2018

(65) Prior Publication Data

US 2020/0165739 A1 May 28, 2020

(51) Int. Cl.
*C25D 5/02* (2006.01)
*C25D 5/54* (2006.01)

(52) U.S. Cl.
CPC .................................... *C25D 5/02* (2013.01); *C25D 5/54* (2013.01)

(58) Field of Classification Search
None
See application file for complete search history.

(56) References Cited

U.S. PATENT DOCUMENTS

| | | | |
|---|---|---|---|
| 4,555,414 A | 11/1985 | Hoover et al. | |
| 4,666,735 A | 5/1987 | Hoover et al. | |
| 5,108,530 A | 4/1992 | Niebling, Jr. et al. | |
| 5,217,563 A | 6/1993 | Niebling, Jr. et al. | |
| 5,499,117 A | 3/1996 | Yin et al. | |
| 7,255,782 B2 | 8/2007 | Crouse | |
| 2002/0197492 A1 | 12/2002 | Hao et al. | |
| 2007/0226994 A1 | 10/2007 | Wollach et al. | |
| 2009/0317609 A1 | 12/2009 | Simmons et al. | |
| 2010/0003523 A1 | 1/2010 | Sharygin et al. | |

(Continued)

FOREIGN PATENT DOCUMENTS

| | | |
|---|---|---|
| JP | S61288094 A | 12/1986 |
| JP | S62235495 A | 10/1987 |

(Continued)

*Primary Examiner* — Stefanie S Wittenberg
(74) *Attorney, Agent, or Firm* — Carmody Torrance Sandak & Hennessey LLP

(57) ABSTRACT

A method of creating a selectively plated three-dimensional thermoplastic part. The method includes the steps of: a) providing a film of uncured polycarbonate film having a hardcoated layer on a first surface thereof; b) selectively catalyzing the polycarbonate film by depositing a catalyst in a desired pattern on the first surface of the polycarbonate film; c) thermoforming the polycarbonate film to form a three-dimensional polycarbonate film; d) UV-curing the hardcoated polycarbonate film by irradiating the film with UV rays; e) molding the hardcoated polycarbonate film to produce a three-dimensional molded part comprising the hardcoated polycarbonate film; f) activating the selectively catalyzed hardcoated polycarbonate film; and g) plating a metal layer on the catalyzed portions of the hardcoated polycarbonate film, wherein the plated metal only deposits on the catalyzed portions of the hardcoated polycarbonate film.

20 Claims, 2 Drawing Sheets

(56) References Cited

U.S. PATENT DOCUMENTS

2013/0344299 A1    12/2013  Sharygin et al.
2016/0037651 A1*   2/2016   Uesugi .................... C23C 18/30
                                                     428/172

FOREIGN PATENT DOCUMENTS

| JP | S63182110 A | 7/1988 | | |
|----|----|----|----|----|
| WO | 2006084064 | 8/2006 | | |
| WO | WO2018153483 | * 10/2015 | ............... | B32B 5/02 |

* cited by examiner

SELECTIVE PLATING OF THREE DIMENSIONAL SURFACES TO PRODUCE DECORATIVE AND FUNCTIONAL EFFECTS

FIELD OF THE INVENTION

The present invention relates generally to an improved method of selectively plating three-dimensional surfaces to produce decorative and functional effects.

BACKGROUND OF THE INVENTION

A wide variety of demands are placed on thermoplastic components, including but not limited to, a surface coating that is abrasion-proof and scratch-resistant, permits a diversity of colors and a high color density and that also enables two-dimensional decorations and/or symbols.

In addition, it is often desirable to selectively decorate a three-dimensional part such that some areas have a metallic outer surface and others have a transparent surface. One such example involves "secret-until-lit" automotive interior parts, in which the article, which may include symbol(s) and/or text appears as a metallic finish until lighting behind the part is switched on. The transparent non-plated areas allow transmission of light and an image appears. Typically, substantially-planar plastic molded products are plated which has the advantage that by illuminating from the backside of the plastic molded product, portions that are left unplated light up.

One method of producing "secret-until-lit" parts involves the use of a multilayer surface of acrylonitrile-butadiene-styrene (ABS) on polycarbonate. The ABS layer is laser ablated imagewise to produce a patterned area of exposed polycarbonate. This can then be plated according to an existing plating-on-plastic method. However, this process is expensive and requires a number of process steps, being both time and labor intensive.

Japanese Pat. Pub. No. JPS61288094 to Sony describes a method for plating a light-transmitting plastic plate except for a desired pattern. The translucent (transparent or semi-transparent) plastic is used for display portions of various devices and has the advantage that by lighting from the reverse side illuminate characters and patterns that are not plated. The method includes an electroless copper layer that is applied to a substrate and that is then imaged with an alkali soluble ink. The surface is then electroplated with nickel, chromium, or similar metal and immersed in an alkali to remove the imaged areas (i.e., ink and electroplated metal). The exposed copper layer is then removed by chemical etching. However, this construction cannot be formed into three-dimensional shapes during processing.

Japanese Pat. Pub. No. JPS62235495 to Kuirihara Mekki Kojo describes a substrate that is coated with a photoresist and then cured imagewise with UV light. Uncured areas are dissolved in a developing solution and the exposed substrate is electroplated. A second development stage then removes the UV-cured resist and exposes the unplated substrate. However, this process does not yield a hardcoat in the unplated areas and the finished part can thus be more easily damaged.

Japanese Pat. Pub. No. JPS63182110 to Mitsubishi describes a mold cavity that is masked with a patterned ceramic layer. A metal is overplated to fill the gaps in the mask. Molding resin is then injected into the cavity and the metallic pattern sticks to the molding resin. This process also does not yield a hardcoat in the unplated areas.

U.S. Pat. Pub. No. 2002/0197492 to Hao et al., the subject matter of which is herein incorporated by reference in its entirety, describes a process of selectively plating a metal pattern on the surface of a two-dimensional or three-dimensional plastic component including the steps of electrolessly depositing a metal coating on the surface of plastic component, followed by photoresist coating, which is then imaged and developed to form a photoresist pattern. The areas with photoresist removed during development are then electroplated, before the remaining photoresist and electroless metal are stripped. However, this process does not allow for subsequent molding or thermoforming of the plastic component.

U.S. Pat. Pub. No. 2007/0226994 to Wollach et al., the subject matter of which is herein incorporated by reference in its entirety, describes a process for applying a base conductive layer by vacuum deposition and then imagewise applying an electrically insulating photoresist. Electroplating is carried out on the areas that do not have any photoresist, and the remaining photoresist is removed and the vacuum deposited base layer is etched. However, this process cannot be used with three-dimensional shapes and does not yield a hardcoat in the unplated areas, and the finished product can be more easily damaged.

U.S. Pat. Pub. No. 2009/0317609 to Simmons et al., the subject matter of which is herein incorporated by reference in its entirety, describes a substrate that is imaged by applying a palladium activator solution (i.e., by inkjet) and then electrolessly plating the imaged areas. The construction is then cured. However, the structure is restricted to reinforced fiber resins and the construction cannot be formed or molded to yield a three-dimensional shape. Nor is there a hardcoat layer.

Thus, it can be seen that there remain a need in the art for an improved method of selectively plating plastic substrates to produce a three-dimensional shape, including a three-dimensional shape that is suitable for use as a "secret-until-lit" part.

It would also be beneficial to provide a selectively plated part that comprises a hardcoated outer surface in the unplated areas to provide improved durability.

Film Insert Molding (FIM) is a form of In-Mold Decorating (IMD) that allows for labeling and graphics to be applied to plastic parts during the molding process. FIM enables components to be integrated into a single unit to create products with scratch resistant hard coatings that are also extremely durable. It can be used in multiple applications but is commonly associated with automotive interiors and handheld electronic devices.

In a typical FIM process, finished decorated components can be produced by inserting decorated, reshaped and trimmed semi-finished film products into the mold during the injection molding process. In this way, components with complex bends can be produced with symbols, transmitted light design and multi-colored two-dimensional decorations and at the same time with simple decoration changes from shot to shot.

FIM allows one to design the appearance of thermoplastic components in a targeted manner. Not only can the decoration (e.g., monochrome, multi-colored, integrated symbols, transmitted light design, etc.), but also the surface impression (e.g., glossy, structured, matte, etc.) and the high gloss can be set selectively.

Thus, the strengths of FIM include the ability to produce a complex-shaped, decorative surface and extreme flexibility in changing decoration.

SUMMARY OF THE INVENTION

It is an object of the present invention to provide a method of selectively plating three-dimensional surfaces.

It is another object of the present invention to provide a method of selectively plating a three-dimensional non-conductive substrate.

It is still another object of the present invention to provide a method of selectively plating a three-dimensional polycarbonate substrate.

It is still another object of the present invention to provide a method of selectively plating a three-dimensional polycarbonate substrate having a hardcoat layer to provide increased durability.

It is still another object of the present invention to provide an improved method of producing a "secret-until-lit" part.

To that end, in one embodiment, the present invention relates generally to a method of creating a selectively plated three-dimensional thermoplastic part, the method comprising the step of:

a) providing a film of uncured polycarbonate film, wherein the uncured polycarbonate film comprises a hard-coated layer on a first surface thereof;

b) selectively catalyzing the polycarbonate film by depositing a catalyst in a desired pattern on the first surface of the polycarbonate film;

c) thermoforming the polycarbonate film to form a three-dimensional polycarbonate film;

d) UV-curing the hardcoated polycarbonate film by irradiating the film with UV rays;

e) activating the selectively catalyzed hardcoated polycarbonate film; and g) plating a metal layer on the catalyzed portions of the hardcoated polycarbonate film, wherein the plated metal only deposits on the catalyzed portions of the hardcoated polycarbonate film.

DETAILED DESCRIPTION OF THE PREFERRED EMBODIMENTS

Figure 1:
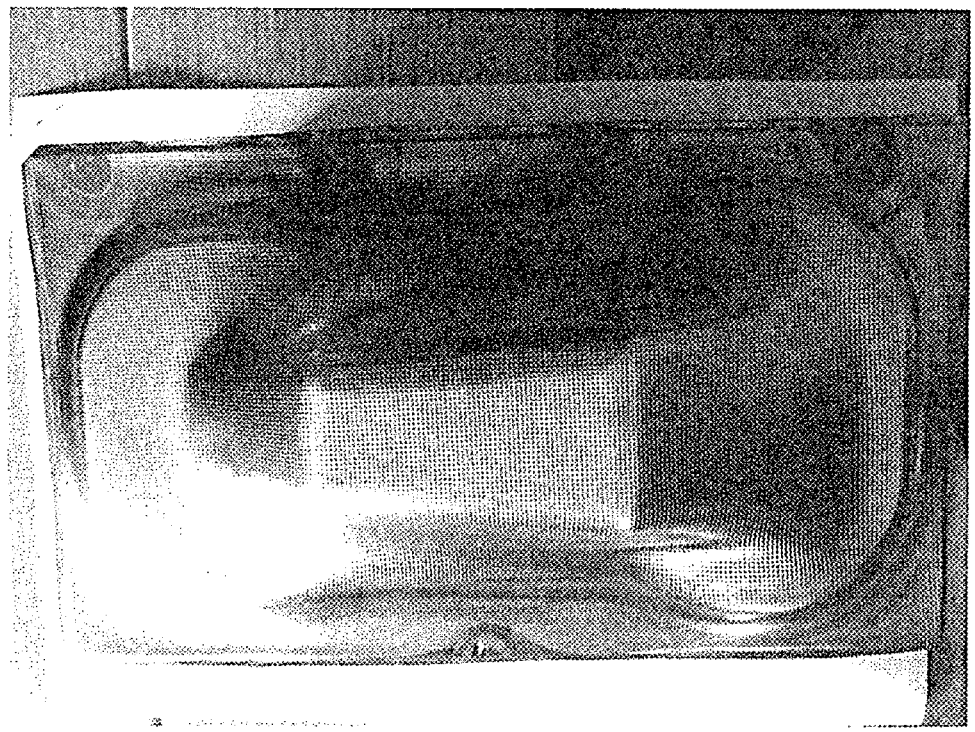
FIG. 1 depicts a view of a sample part as produced in accordance with the process of Example 1 after a complete plating process with a mesh type pattern of plated metal visible.

"A," "an," and "the" as used herein refer to both singular and plural referents unless the context clearly dictates otherwise.

As used herein, the term "about" refers to a measurable value such as a parameter, an amount, a temporal duration, and the like and is meant to include variations of +1-15% or less, preferably variations of +/−10% h or less, more preferably variations of +/−5% or less, even more preferably variations of +/−1% or less, and still more preferably variations of +/−0.1% or less of and from the particularly recited value, in so far as such variations are appropriate to perform in the invention described herein. Furthermore, it is also to be understood that the value to which the modifier "about" refers is itself specifically disclosed herein.

As used herein, spatially relative terms, such as "beneath", "below", "lower", "above", "upper" and the like, are used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. It is further understood that the terms "front" and "back" are not intended to be limiting and are intended to be interchangeable where appropriate.

As used herein, the terms "comprises" and/or "comprising," specify the presence of stated features, integers, steps, operations, elements, and/or components, but do not preclude the presence or addition of one or more other features, integers, steps, operations, elements, components, and/or groups thereof.

The inventors of the present invention have discovered that a film insert molding process can be modified and improved to create a selectively-plated three-dimensional part that comprises a scratch-resistant, impact-resistant hardcoating and is suitable for producing a secret-until-lit or other similar part in an efficient manner. The method described herein provides for the selective decoration of a three-dimensional part such that some areas have a metallic outer surface while other areas have a hardcoated transparent surface. In one embodiment, the outer surface of the part appears as a metallic finish until lighting behind the part is switched on. The transparent non-plated areas would then allow transmission of light and an image would appear.

In one embodiment, the present invention relates generally to a method of creating a selectively plated three-dimensional thermoplastic part, the method comprising the step of:

a) providing a film of uncured polycarbonate film, wherein the uncured polycarbonate film comprises a hard-coated layer on a first surface thereof;

b) selectively catalyzing the polycarbonate film by depositing a catalyst in a desired pattern on the first surface of the polycarbonate film;

c) thermoforming the polycarbonate film to form a three-dimensional polycarbonate film;

d) UV-curing the hardcoated polycarbonate film by irradiating the film with UV rays;

e) activating the selectively catalyzed hardcoated polycarbonate film; and f) plating a metal layer on the catalyzed portions of the hardcoated polycarbonate film, wherein the plated metal only deposits on the catalyzed portions of the hardcoated polycarbonate film.

In one embodiment, the three-dimensional thermoplastic part comprises a polycarbonate film or layer that is thermally molded and formed to produce the three-dimensional polycarbonate part. In one embodiment, the polycarbonate film or layer is at least one of transparent, semi-transparent or translucent. As described herein, in one embodiment, the polycarbonate part is processed to prepare a "secret-until-lit" pattern, symbol, icon or graphic in a three-dimensional polycarbonate part that can be illuminated from the backside of the part such that portions that are left unplated light up when illuminated.

Furthermore, it is noted that while the invention is described as it relates to a hardcoated polycarbonate film, other thermoplastic materials that are capable of being used in a plating-on-plastic process and that can be thermoformed may also be used in the practice of the invention to produce a three-dimensional thermoplastic part having a hardcoated layer that is processed in accordance with the steps described herein.

The hardcoated polycarbonate film preferably has a thickness of between about 50μ and 500μ, more preferably between about 100μ and about 300μ, depending in part on the molding process being used and the configuration and attributes of the desired finish product. By "hardcoated" what is meant is that the coating is at least one of abrasion-resistant, scratch-resistant, solvent-resistant, and durable.

The hardcoated polycarbonate film must also be suitable for thermoforming. As described herein, the hardcoated polycarbonate film is subjected to various process steps and must therefore be capable of withstanding thermoforming without cracking or breaking during the thermoforming process.

One suitable hardcoated polycarbonate film is available under the tradename XtraForm™ M HCL from MacDermid Enthone Inc. XtraForm™ M HCL is a formable hardcoated polycarbonate film available in 180μ and 250μ thicknesses with a glossy finish on the hardcoated side and a matt second surface. A protective laminate is supplied on the hardcoated surface to protect the film during transport.

Optionally, but preferably, the second surface of the polycarbonate film (i.e., the side opposite the hardcoat layer) can be decorated, printed, or otherwise coated with a colored ink in order for the finished product to exhibit a desired color, pattern, or finish.

Thus, in one embodiment, clear or colored transparent or translucent inks or resins may be printed or otherwise applied to the second surface of the polycarbonate substrate to create selective tinting and/or an opaque design. For example, yellow transparent or translucent ink may be printed on the second surface of the substrate in a selective manner (i.e., stripes), thereby creating a decorated, printed and/or patterned appearance when viewed through the front surface of the substrate when the polycarbonate substrate is backlit. In the alternative, an opaque ink, such as a black or dark-colored ink may be selectively printed on the second surface of the substrate to so that a desired graphic design or icon is visible from the front surface of the polycarbonate part when the part is back-lit. These techniques may also be used in combination with each other. For example, a black or other dark-colored ink may be screen printed or otherwise patterned to create one or images on the second surface of the polycarbonate substrate and thereafter one or more transparent or translucent colored inks may be applied over the one or more. In another embodiment, a uniform layer of a transparent or translucent colored ink is applied uniformly over all of the second surface, or substantially all of the second surface, or on selected portions of the second surface and then a black or dark colored ink is stenciled or otherwise applied in a pattern on top of the transparent or translucent colored ink.

As described herein, the first side of the thermoplastic film (i.e., the side of the thermoplastic film with the hardcoat layer), which may be a hardcoated polycarbonate film, is activated with a catalytic activator. In one embodiment, the catalytic activator is a plating catalyst that is printed or otherwise applied to the hardcoated polycarbonate film in a desired pattern and is allowed to dry.

The plating catalyst may be screen printed onto the hardcoated polycarbonate film to create the desired pattern. Other printing means, including, but not limited to, gravure, lithography, and flexography, can also be used to print the plating catalyst in the desired pattern on the substrate. Typical catalyst components include, for example, palladium, gold, silver, tin, nickel, ruthenium, platinum, and rhodium. One suitable printable plating catalyst comprises a dispersion of a palladium salt in a thermally or UV-curable binder.

It is highly desirable that the plating catalyst be a UV curable and formable formulation. One such plating catalyst comprises a catalytic ink such as described in U.S. Pat. No. 7,255,782 to Crouse, the subject matter of which is herein incorporated by reference in its entirety.

Prior to thermoforming, the polycarbonate film is pre-dried, because it has a tendency to absorb moisture at a high rate. Trapped moisture forms vapor above about 120° C. and the vapor expansion creates bubbles in the sheet. The duration of pre-drying is dependent in part on the amount of humidity absorbed by the sheet and by its thickness and can be readily determined by one skilled in the art. In one embodiment, the polycarbonate film is placed in a dehumidifying air circulating oven for pre-drying at a temperature of between about 90° C. and about 135° C., more preferably at a temperature of about 115° C. and about 125° C. In addition, the polycarbonate sheet begins absorbing moisture immediately upon removal from the pre-drying oven and the rate of absorption is dependent upon the ambient dew point. For this reason, the polycarbonate film is immediately transferred to the forming machine.

Thermoforming can be carried out at moderate to high temperature, depending on the type of forming process used. Polycarbonate becomes more flexible at higher temperatures and the temperature is one that typically approaches or exceeds the glass transition temperature. In one embodiment, the temperate is one that is above the glass transition temperature (i.e., about 150° C.) and below the melt temperature (i.e., about 267° C.). In another embodiment, the temperature is a moderate temperature that is between about 110 and about 130° C.

Various thermoforming processes can be used, including, for example, high pressure thermoforming, and vacuum thermoforming. In vacuum forming, the film is heated to above its glass transition temperature and a vacuum pump is used to create a low pressure area under the film, allowing the external air pressure to push the film over the form.

In high pressure forming, hot air is applied to the film under high pressure (up to about 300 bar). As the substrate is subjected to such high pressure with comparatively less heat as compared with vacuum forming, the film can be formed below its softening temperature, which can improve print-to-form registration. High pressure thermoforming is described, for example in U.S. Pat. Nos. 5,217,563 and 5,108,530, both to Niebling et al., the subject matter of each of which is herein incorporated by reference in its entirety.

When the polycarbonate sheet reaches its forming temperature, uniform "sag" occurs. The amount of sag depends on the size and thickness of the sheet. Thermoforming creates the desired three-dimensional shape with a hardcoated front surface. Optimum heating times and temperatures depend on a number of factors, including, but not limited to, thickness of the sheet, type of mold being used, and degree of stretching required.

After thermoforming to the shape required the three-dimensional product is UV-cured to provide maximum scratch and chemical resistance.

In one embodiment, optionally, but preferably, the thermoformed and UV-cured three-dimensional parts may be placed in an injection molding tool and back injected with a thermoplastic resin to create the finished thermoformed and molded three-dimensional part. The thermoplastic resin may be the same or different from the resin used in the thermoplastic film. In one preferred embodiment, both the thermoplastic film and the thermoplastic resin comprise polycarbonate. However, other similar thermoplastic materials may also be used in the process of the present invention and the present invention is not limited to polycarbonates.

The three-dimensional polycarbonate part is selectively plated with a metal plating layer. The plated metal deposits only on the areas where the printed catalyst is present. The metal to be plated may be selected, for example, from the group consisting of copper, zinc, nickel, alloys of the foregoing, and combinations of one or more of the foregoing. Other suitable metals may also be plated in the method described herein.

Furthermore, it is also noted that plating can be a multilayer process, including one or more layers of plated metal that may be applied by electroless plating, electrolytic plating or combinations of the foregoing. One such plating methodology that is suitable for use in the present invention is described, for example, in U.S. Pat. No. 7,255,782 to Crouse, the subject matter of which is herein incorporated by reference in its entirety.

These plating baths generally contain the metal to be deposited in the form of salts dissolved in aqueous solution as well as a reducing agent for the metal salt. The metallization step may include electroless and/or electrolytic coating to obtain the desired metallic finish. Typical metals that may be deposited by electroless plating include copper, nickel or a nickel alloy containing phosphorus and/or boron.

In one embodiment, the plating process comprises deposition of an electroless metal such as copper to a depth of between about 10 and about 75 microns, more preferably between about 20 and about 35 microns, and then deposition of electrolytic metal such as copper to a depth of between about 1 to about 10 microns, more preferably between about 3 and about 8 microns. Thereafter, the part is thermally cured at a temperature of between about 150 and about 220° C. Finally, the part is electrolytically plated with a layer of copper followed by a layer of nickel, and then a layer of chromium. Each of these layers preferably has a thickness of between about 10 and about 50 microns, more preferably between about 20 and about 35 microns In one embodiment, a suitable sequence of process steps is as follows:

1) Provide a film of uncured polycarbonate film having a hardcoated layer on a first surface thereof;
2) Printing a desired color, pattern, metallic-like finish, etc. on a second surface of the polycarbonate film (i.e., the surface without the hardcoating);
3) selectively catalyzing the polycarbonate film by printing a printable catalyst in a desired pattern (i.e., by screen printing, gravure printing, lithography, flexography, etc.) on the first surface of the polycarbonate film;
4) Thermoforming the polycarbonate film to form a three-dimensional part, wherein the hardcoated layer is on an external surface;
5) UV-curing the hardcoated polycarbonate film by irradiating the film with UV rays;
6) Molding the hardcoated polycarbonate film into a desired three-dimensional shape;
7) Activating the selectively catalyzed hardcoated polycarbonate film;
8) Electroless plating a seed layer of copper or other electroless metal on the catalyzed portions of the hardcoated polycarbonate film, wherein the plated metal only deposits on the catalyzed portions of the hardcoated polycarbonate film;
9) Electrolytic plating a metal layer over the top of the electroless metal deposit, wherein the electrolytically plated metal may be selected from the group consisting of copper, copper alloy, zinc, zinc alloy, nickel, nickel alloy, iron, lead alloy, or other similar metals by way of example and not limitation;
10) Baking the finished product; and
11) If desired, applying an additional metal plating layer by electrolytic plating.

The process described herein can be used to produce a three-dimensional polycarbonate part that is selectively "decorated" with metallic features but that also comprises a hydrophobic, hard-coated scratch-resistant surface.

The above series of steps was used to produce selectively decorated formed hardcoated thermoplastic parts that have good durability and are at least one of abrasion-resistant, scratch-resistant and solvent-resistant. These three-dimensional parts may be backlit such that the transparent portions of the three-dimensional part reveal the image when lit (i.e., a "secret-until-lit" three dimensional part is created).

The invention will now be described in reference to the following non-limiting examples:

Example 1

A 305×458 mm sheet of XtraForm™ G2502L coated polycarbonate film was screen printed on the second (uncoated) surface by applying a uniform layer of transparent green ink (Noriphan 669, Proell, Germany) across the whole sheet. A stencil was then applied containing a text pattern such that a second layer of black ink (Noriphan HTR 953, Proell, Germany) could be applied imagewise to form a text phrase on top of the green ink layer. As per the manufacturer's recommendations, each ink was diluted with 10% Noriphan M201 Retarder (Proell, Germany) and 5% Noriphan F013 thinner (Proell, Germany). Each ink layer was dried by passage of the film through a Trumax Infra Red conveyor system (Natgraph Ltd, Nottingham, UK) at 80° C. for 2 minutes with a belt speed of 1 m/minute.

The printed film was then turned over and a second screen printing stencil was applied to the first surface containing a pattern of dots. This was used to screen print a pattern onto the first surface using a catalytic ink—Microcat, available from MacDermid Enthone Electronic Solutions, Waterbury, Conn., USA. The Microcat ink comprises two parts (Part A and Part B) that need to be pre-mixed before printing in the ratio of 98:2 Part A:Part B. After Microcat printing, the film was passed through the Trumax Infra Red Dryer 3 times, with each pass comprising 2 minutes at 80° C. with a belt speed of 1 m/minute. The printed and dried film was then formed into a 3D shape using a Clarke 725 FLB Vacuum Former (CR Clarke, Ammanford, UK) equipped with a forming tool to deform the film using a tool temperature of 200° C. and a forming time of 10 seconds. The film was formed with the coloured ink layers next to the forming tool such that the surface with the Microcat printing was away from the tool. After forming, the film was UV cured on a Fusion DRSE-120 conveyor (UVio Systems, Thatcham, UK) to a dose of 2 J/cm². The prepared film was plated to deposit metal only in the areas where the Microcat was present from the screen printing step. The plating process comprised the following steps;

| Step | Plating Solution | Time | Temperature ° C. | Current Density A/dm² | Description |
|---|---|---|---|---|---|
| 1 | Sodium Hyposphosphite 40 g/L | 10 mins | 40 | n/a | Reducer |
| 2 | Macuplex EN707 pH 9 | 10 mins | 45 | n/a | Electroless nickel |
| 3 | Rinse well with water | | | | |
| 4 | CuMac Optima | 40 mins | 25 | 3.5 | Acid copper |
| 5 | Rinse well with water | | | | |
| 6 | 66 Microetch | 30 sec | ambient | n/a | Adhesion promotor |
| 7 | Rinse well with water | | | | |
| 8 | Elpelyt LS1 | 20 mins | 55 | 3.5 | Bright nickel |
| 9 | Rinse well with water | | | | |
| 10 | Trilyte Flash SF POP | 7 mins | 60 | 10.0 | Trivalent chrome |
| 11 | Rinse well with water | | | | |
| 12 | Dry | | | | |

FIG. 1 shows the sample that was obtained after the full plating process, with a mesh type pattern of plated metal visible.

Figure 2:
FIG. 2 depicts a view of the same sample part as FIG. 1 when illuminated from the rear with a white light.

FIG. 2 shows the same part when illuminated from the rear with a white light, showing the Graphic image that appears.

Example 2

Figure 3:
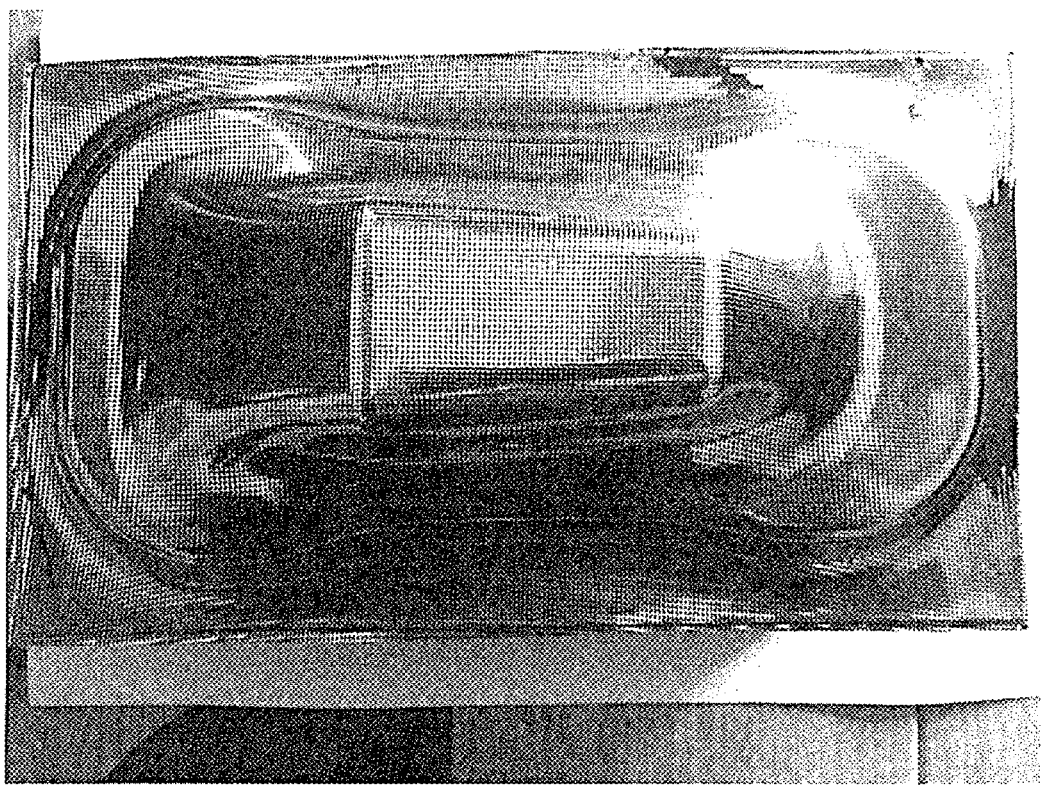
FIG. 3 depicts a view of a sample part as produced in accordance with the process of Example 2 after a complete plating process with a mesh type pattern of plated metal visible.
Figure 4:
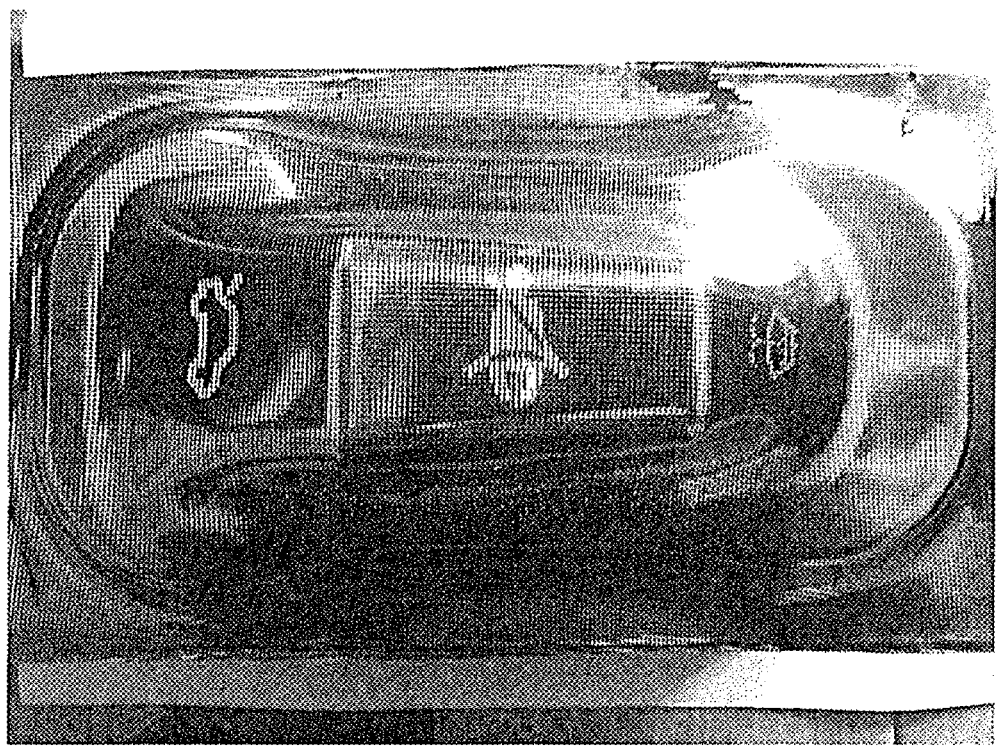
FIG. 4 depicts a view of the same part as FIG. 3 when illuminated from the rear with a white light.

A 305×458 mm sheet of XtraForm™ G2502L coated polycarbonate film was screen printed on the second (uncoated) surface by applying a layer of black ink (Noriphan HTR953) through a stencil that had been patterned in three areas to create images. Blocks of colored ink—one transparent red (Noriphan 372, Proell, Germany), one transparent blue (Noriphan 566, Proell, Germany), and one transparent green (Noriphan 669) were then printed on top of the black ink, one colour of ink applied to each of the patterned black areas. As per the manufacturer's recommendations, each ink was diluted with 10% Noriphan M201 Retarder (Proell, Germany) and 5% Noriphan F013 thinner (Proell, Germany). Each ink layer was dried by passage of the film through a Trumax Infra Red conveyor system (Natgraph Ltd, Nottingham, UK) at 80° C. for 2 minutes at a belt speed of 1 m/minute. Further processing was then conducted in an identical fashion to Example 1, comprising printing of a Microcat dot pattern, vacuum forming, UV curing and the subsequent plating steps. FIG. 3 shows the sample that was obtained after the full plating process, with a mesh type pattern of plated metal visible. FIG. 4 shows the same part when illuminated from the rear with a white light, showing the Graphic images that appear.

The present invention describes a solution to producing a three-dimensional thermoplastic part that is selectively decorated with metallic features but that also comprises a hydrophobic hardcoated scratch- and abrasion-resistant surface.

The present invention is compatible with all types of printing (screen printing, inkjet printing, etc.). In addition, the coating can be cured from the first surface, the second surface, or both. As well, the electroless plating and/or electrolytic plating can be carried out after the forming and molding steps. As described herein, the finished article can be selectively plated on the first surface and color decorated (i.e., ink) on the second surface. The method does not involve any etching and therefore minimizes topography. The method described herein is also compatible with any aqueous plating chemistry.

Finally, it should also be understood that the following claims are intended to cover all of the generic and specific features of the invention described herein and all statements of the scope of the invention that as a matter of language might fall there between.

What is claimed is:

1. A method of creating a selectively plated three-dimensional thermoplastic part, the method comprising, in order, the steps of:
   a) providing a film of uncured thermoplastic film, wherein the uncured thermoplastic film comprises a hardcoated layer on a first surface thereof;
   b) selectively catalyzing the thermoplastic film by depositing a catalyst in a desired pattern on the first surface of the thermoplastic film;
   c) thermoforming the thermoplastic film to form a three-dimensional thermoplastic film;
   d) UV-catalyst the hardcoated thermoplastic film by irradiating the film with UV rays;
   e) activating the selectively catalyzed hardcoated thermoplastic film; and
   f) plating a metal layer on the catalyzed portions of the hardcoated thermoplastic film, wherein the metal layer only deposits on the catalyzed portions of the hardcoated thermoplastic film.

2. The method according to claim 1, further comprising the step of applying an ink to a second surface of the thermoplastic film prior to step b).

3. The method according to claim 2, wherein the ink is a colored ink that is applied by printing, and wherein the ink exhibits a desired color or pattern or finish on the second surface of the thermoplastic film.

4. The method according to claim 1, further comprising the step of molding the hardcoated thermoplastic film to produce a three-dimensional molded part comprising the hardcoated thermoplastic film after step d).

5. The method according to claim 1, wherein the thermoplastic film has a thickness of between about 50 microns and about 500 microns.

6. The method according to claim 5, wherein the thermoplastic film has a thickness of between about 100 microns and about 300 microns.

7. The method according to claim 1, wherein the step of plating the metal layer on the catalyzed portions of the hardcoated thermoplastic film comprises:
   a) reducing the catalyst a) reducing the catalyst with a reducing agent;
   b) electrolessly plating a seed layer of electroless metal on the catalyzed portions of the hardcoated thermoplastic film; and
   c) electrolytically plating the metal layer over the top of the seed layer of electroless metal.

8. The method according to claim 7, wherein the reducing agent comprises a hypophosphite salt or a borohydride salt.

9. The method according to claim 7, wherein the electroless metal comprises copper, nickel, or nickel alloy.

10. The method according to claim 7, wherein the metal layer of step (c) is selected from the group consisting of copper, copper alloy, zinc, zinc alloy, nickel, nickel alloy, iron, lead alloy, chromium, and combinations of one or more of the foregoing.

11. The method according to claim 1, wherein the metal layer has a thickness of between about 10 microns and about 300 microns.

12. The method according to claim 11, wherein the metal layer has a thickness of between about 30 microns and about 150 microns.

13. The method according to claim 1, wherein the thermoplastic part is transparent or translucent.

14. The method according to claim 1, further comprising a step of thermally curing the selectively plated three-dimensional thermoplastic part at a temperature of between about 150 and about 220° C.

15. The method according to claim 1, further comprising a step of applying one or more additional metal plating layers.

16. The method according to claim 15, wherein the metal layer comprises a layer of copper, a layer of nickel or nickel alloy plated on the layer of copper, and a layer of chromium plated on the layer of nickel or nickel alloy.

17. The method according to claim 1, wherein prior to thermoforming, the thermoplastic film is pre-dried.

18. The method according to claim 1, wherein the thermoplastic film is selected from the group consisting of polycarbonates, polyesters, polyethylene terephthalate, and polyarylate.

19. The method according to claim 18, wherein the thermoplastic film comprises polycarbonate.

20. The method according to claim 1, wherein the thermoplastic film is a multilayer film.

* * * * *

UNITED STATES PATENT AND TRADEMARK OFFICE
CERTIFICATE OF CORRECTION

| | | |
|---|---|---|
| PATENT NO. | : 11,015,255 B2 | Page 1 of 1 |
| APPLICATION NO. | : 16/201092 | |
| DATED | : May 25, 2021 | |
| INVENTOR(S) | : Paul Andrew Bray et al. | |

It is certified that error appears in the above-identified patent and that said Letters Patent is hereby corrected as shown below:

In the Claims

Column 11, Line 10, Claim 7:
Delete "reducing the catalyst a)"

Signed and Sealed this
Twenty-ninth Day of November, 2022

*Katherine Kelly Vidal*

Katherine Kelly Vidal
*Director of the United States Patent and Trademark Office*